United States Patent
Oyama et al.

(10) Patent No.: US 7,847,621 B2
(45) Date of Patent: Dec. 7, 2010

(54) CONTROL CIRCUIT AND CONTROL METHOD FOR CHARGE PUMP CIRCUIT

(75) Inventors: Manabu Oyama, Ukyo-Ku (JP); Daisuke Uchimoto, Ukyo-Ku (JP)

(73) Assignee: Rohm Co., Ltd. (JP)

(*) Notice: Subject to any disclaimer, the term of this patent is extended or adjusted under 35 U.S.C. 154(b) by 68 days.

(21) Appl. No.: 12/269,953

(22) Filed: Nov. 13, 2008

(65) Prior Publication Data
US 2009/0121781 A1   May 14, 2009

(30) Foreign Application Priority Data
Nov. 13, 2007  (JP) ............................. 2007-294666
Nov. 13, 2007  (JP) ............................. 2007-294671

(51) Int. Cl.
*G05F 1/10* (2006.01)
(52) U.S. Cl. .......................................... 327/536; 363/60
(58) Field of Classification Search ................. 327/536; 363/59–60
See application file for complete search history.

(56) References Cited

U.S. PATENT DOCUMENTS

| | | | | |
|---|---|---|---|---|
| 6,052,022 A | * | 4/2000 | Lee | ............................. 327/589 |
| 6,268,761 B1 | * | 7/2001 | Naganawa | ................... 327/536 |
| 6,400,211 B1 | * | 6/2002 | Yokomizo et al. | ........... 327/536 |
| 6,411,531 B1 | * | 6/2002 | Nork et al. | ..................... 363/60 |
| 7,042,276 B2 | * | 5/2006 | Tanaka | ........................ 327/536 |
| 7,208,997 B2 | * | 4/2007 | Sohara | ........................ 327/536 |
| 7,259,974 B2 | * | 8/2007 | Donaldson et al. | ............ 363/60 |
| 7,304,871 B2 | * | 12/2007 | Ito et al. | ........................ 363/59 |
| 7,466,189 B2 | * | 12/2008 | Sohara et al. | ................ 327/536 |
| 2002/0153939 A1 | * | 10/2002 | Hirata | ........................ 327/536 |
| 2007/0216374 A1 | * | 9/2007 | Komiya | ....................... 323/225 |
| 2008/0158915 A1 | * | 7/2008 | Williams | ................. 363/21.06 |
| 2009/0261891 A1 | * | 10/2009 | Yeh et al. | ..................... 327/536 |

FOREIGN PATENT DOCUMENTS

JP  2000-262043 A   9/2000

* cited by examiner

*Primary Examiner*—Lincoln Donovan
*Assistant Examiner*—Thomas J Hiltunen
(74) *Attorney, Agent, or Firm*—Cantor Colburn LLP

(57) ABSTRACT

A charge pump circuit includes a first switch to a fourth switch, a flying capacitor, and an output capacitor. A driver turns on the first switch and the fourth switch during a predetermined precharge period from the start of activation of the charge pump circuit to charge the output capacitor. Thereafter, on the basis of a pulse signal, the driver alternately turns on and off a first pair and a second pair.

27 Claims, 7 Drawing Sheets

CONTROL CIRCUIT AND CONTROL METHOD FOR CHARGE PUMP CIRCUIT

BACKGROUND OF THE INVENTION

1. Field of the Invention

The present invention relates to a charge pump circuit.

2. Description of the Related Art

In a recent electronic apparatus such as a mobile phone or a PDA (Personal Digital Assistants), a device, which requires a drive voltage higher than a battery voltage, such as an LED (Light Emitting Diode) used for a liquid crystal backlight is mounted. In each of these compact information terminals, for example, a Li-ion battery is frequently used, the output voltage is about 3.5 V in general and about 4.2 V in a full charged state. For this reason, the LED requires a voltage higher than the battery voltage as the drive voltage. In this manner, when the voltage higher than the battery voltage is necessary, the battery voltage is boosted by using a charge pump circuit or a switching regulator, and a voltage required to drive the LED is obtained.

The charge pump circuit generates an output voltage obtained by multiplying an input voltage by a predetermined boost ratio. For example, when the battery voltage is 3 V and the boost ratio is twice, an output voltage is fixed to 6 V. Therefore, when a load circuit requires a drive voltage lower than 6 V, a power transistor is inserted on an input side or an output side of the charge pump circuit to configure a regulator. An ON-resistance of the regulator must be adjusted to adjust the output voltage. A related art is described in Japanese Patent Application (Laid Open) No. 2000-262043.

The present inventors considered a pulse modulation type charge pump circuit which modulates an ON-time of a switching device of a charge pump circuit to stabilize an output voltage and accordingly recognized the following problem.

As in a conventional art, when a charge pump circuit is combined to a regulator using a power transistor the ON-resistance of which is adjusted, a reference voltage of the regulator is moderately changed to make it possible to soft-start the charge pump circuit.

However, in control of an ON-time of a switching device of a charge pump circuit by pulse modulation without using a regulator, when the switching device is turned on, even though the ON-time is short, a large electric current (rush electric current) flows in a flying capacitor or an output capacitor having a small amount of electric charge. Such a problem may occur in not only a pulse-modulation type charge pump circuit but also in a fixed-duty type charge pump circuit.

SUMMARY OF THE INVENTION

The present invention has been made in consideration of the problem, and has as its general purpose to provide a charge pump circuit the rush current of which is suppressed.

(1) An embodiment of the present invention relates to a control circuit for a charge pump circuit. The charge pump circuit includes a flying capacitor and an output capacitor. The control circuit includes: a first switch arranged between a first input terminal to which a first input voltage is applied and one end of the flying capacitor; a second switch arranged between the other end of the flying capacitor and a fixed voltage terminal; a third switch arranged between a second input terminal to which a second input voltage is applied and the other end of the flying capacitor; a fourth switch arranged between the one end of the flying capacitor and one end of the output capacitor; and a driver which turns on any one of a first pair consisting of the first and second switches and a second pair consisting of the third and fourth switches during a period corresponding to a high period of a pulse signal and which turns on the other pair during a period corresponding to a low period of the pulse signal. The driver turns on the first and fourth switches during a predetermined precharge period after the start of activation of the charge pump circuit to change the output capacitor. The first and second pairs are alternately turned on and off on the basis of the pulse signal.

A "duty ratio" means a ratio of the high period to a cycle time of a pulse signal.

During the precharge period, the first and fourth switches are turned on to charge the output capacitor by the first input voltage. In a normal switching operation, a sum of the first input voltage and the second input voltage is applied to the output capacitor, and a rush current may be generated. According to the embodiment, since the first input voltage is applied during only the precharge period, the rush current can be prevented.

When a first input voltage Vin1 is higher than a second input voltage Vin2, the driver, during the precharge period, turns on, in addition to the first and fourth switches, the third switch and turns off the second switch, so that the flying capacitor may be charged by a difference voltage (Vin1−Vin2) between the first input voltage Vin1 and the second input voltage Vin2.

If the flying capacitor is charged by the first input voltage Vin1 during the precharge period, after the end of the precharge period, immediately after a normal switching operation is started, a large voltage given by Vin1+Vin2 is applied to the output capacitor. According to the embodiment, since a voltage (Vin1−Vin2)+Vin2=Vin1 is applied to the output capacitor immediately after the normal switching operation is started, a rush current can be preferably prevented.

When the first input voltage and the second input voltage are commonly connected, and when the first input voltage and second input voltage are equal to each other, the driver may turn off the second switch during the precharge period.

In this case, the flying capacitor is not charged by the first input voltage during the precharge period, and a rush current can be preferably prevented because the second input voltage Vin2 is applied to the output capacitor immediately after the normal switching operation is started.

The control circuit according to an embodiment may further include a pulse modulator which generates a pulse signal the duty ratio of which is adjusted to make a feedback voltage depending on an output voltage from the charge pump circuit equal to a predetermined reference voltage. After the end of the precharge period, the pulse modulator may raise the reference voltage with time, and the driver may drive the first to fourth switches on the basis of the pulse signal.

When the reference voltage is raised as a soft-start voltage, an output voltage can be moderately raised after the end of the precharge period.

The control circuit according to an embodiment may further include an input switch which is arranged on a path extending from the first input terminal to the output capacitor and the ON-resistance of which can be switched. The driver turns on the input switch at a high ON-resistance during a predetermined soft-start period from the start of activation of the charge pump circuit. Thereafter, the ON-resistance of the input switch may be switched to be low.

When the ON-resistances of the first and fourth switches are very low, a large current may flow into the output capacitor. In this case, the input switch is arranged to increase the ON-resistance, so that the current flowing in the output capacitor can be suppressed.

The input switch may be arranged between the first switch and the first input terminal. The input switch may be arranged between a connection point between the fourth switch and the flying capacitor and the first switch.

In this case, after the charge pump circuit starts the normal switching operation, a charging current for the flying capacitor can be controlled.

The input switch may be arranged between the fourth switch and the output capacitor. The input switch may be arranged between a connection point between the first switch and the flying capacitor and the fourth switch.

In this case, after the charge pump circuit starts the normal switching operation, a charging current for the output capacitor can be controlled.

The input switch includes a plurality of MOSFETs connected in parallel to each other, and an ON-resistance may be switched by a combination of ON and OFF states of the MOSFETs.

The first and fourth switches are MOSFETs, and body diodes of the MOSFETs of the input switch may be arranged in a direction opposing the direction of body diodes of the first and fourth switches. In this case, a leak current flowing from the first input terminal to the output capacitor can be interrupted.

The pulse modulator may perform pulse width modulation having a predetermined cycle and a changeable pulse width.

Another embodiment of the present invention is a charge pump circuit. The charge pump circuit includes a flying capacitor, an output capacitor, and any one of the above-described control circuits which control charging/discharging states of the flying capacitor and the output capacitor.

Still another embodiment of the present invention relates to a method of controlling a charge pump circuit including a flying capacitor and an output capacitor. This method includes precharging and switching. The precharging charges the output capacitor by using a first input voltage during a predetermined precharge period after the start of activation of the charge pump circuit. The switching alternately executes the charging the flying capacitor by the first input voltage and discharging the output capacitor by connecting one end of the flying capacitor to the output capacitor and applying a second input voltage to the other end of the flying capacitor.

When the first input voltage is higher than the second input voltage, the precharging may charge the flying capacitor by a difference voltage between the first input voltage and the second input voltage.

The switching may include: generating an error voltage obtained by amplifying an error between a feedback voltage depending on an output voltage from the charge pump circuit and a predetermined reference voltage; slicing the error voltage by a triangular-wave signal having a predetermined cycle to generate a pulse signal having a modulated pulse width; limiting a pulse width of the pulse signal within a predetermined range; and executing any one of the charging and the discharging during a time depending on a high period of the pulse signal and executing the other during a time depending on a low period.

The switching may raise the reference voltage with time after the precharge period.

(2) An embodiment of the present invention relates to a control circuit for a charge pump circuit. The charge pump circuit includes a flying capacitor and an output capacitor. The control circuit includes: a first switch arranged between a first input terminal to which a first input voltage is applied and one end of the flying capacitor; a second switch arranged between the other end of the flying capacitor and a fixed voltage terminal; a third switch arranged between a second input terminal to which a second input voltage is applied and the other end of the flying capacitor; a fourth switch arranged between the one end of the flying capacitor and one end of the output capacitor; a driver which turns on any one of a first pair consisting of the first and second switches and a second pair consisting of the third and fourth switches during a period corresponding to a high period of a pulse signal and which turns on the other pair during a period corresponding to a low period of the pulse signal; and an input switch which is arranged on a path extending from the first input terminal to the output capacitor and the ON-resistance of which can be switched. The input switch is turned on at a high ON-resistance during a predetermined soft-start period after the start of activation of the charge pump circuit and, thereafter, turned on at a low ON-resistance.

According to the embodiment, an impedance of an electric charging path to the flying capacitor or the output capacitor, that is, an electric charging capability can be limited, and a rush current can be prevented.

The driver may turn on the first and fourth switches during the predetermined precharge period after the start of activation of the charge pump circuit to charge the output capacitor. Thereafter, the first and second pairs may be alternately turned on and off on the basis of the pulse signal.

In this case, the input switch and the first and fourth switches are turned on to charge the output capacitor with the first input voltage. At this time, since an impedance of the electric charging path decreases by the input switch, the output capacitor is moderately charged. In a normal switching operation, a sum of the first input voltage and the second input voltage is applied to the output capacitor, and a rush current may be generated. According to the embodiment, since the first input voltage is applied during only the precharge period, the rush current can be prevented.

When the first input voltage $Vin1$ is higher than the second input voltage $Vin2$, the driver may turn on, in addition to the first and fourth switches, the third switch and may turn off the second switch during the precharge period, so that the flying capacitor may be charged with a difference voltage between the first input voltage and the second input voltage.

If the flying capacitor is charged with the first input voltage $Vin1$ during the precharge period, after the end of the precharge period, immediately after the start of the normal switching operation, a large voltage given by $Vin1+Vin2$ is applied to the output capacitor. According to the embodiment, since a voltage $(Vin1-Vin2)+Vin2=Vin1$ is applied to the output capacitor immediately after the normal switching operation is started, a rush current can be preferably prevented.

When the first input terminal and the second input terminal are commonly connected and the first input voltage and the second input voltage are equal to each other, the driver may turn off the second switch during the precharge period.

In this case, the flying capacitor is not charged with the first input voltage during the precharge period. Immediately after the normal switching operation is started, the second input voltage $Vin2$ is applied to the output capacitor. For this reason, a rush current can be preferably prevented.

The control circuit may further include a pulse modulator which generates the pulse signal the duty ratio of which is adjusted to make a feedback voltage depending on an output voltage from the charge pump circuit equal to a predetermined reference voltage. After the end of the precharge period, the pulse modulator may raise the reference voltage with time, and the driver may drive the first to fourth switches on the basis of the pulse signal.

The "duty ratio" means a ratio of the high period to a cycle time of the pulse signal. When the pulse modulation is to be performed, immediately after the activation, an error between an output voltage and a target voltage increases. For this reason, a feedback operation is performed to obtain the maximum electric charging capability to the output capacitor. In this control system, a soft start which moderately raises the reference voltage is combined to the above art to make it possible to further preferably prevent a rush current.

The input switch may be arranged between the first switch and the first input terminal.

The input switch may be arranged between a connection point between the fourth switch and the flying capacitor and the first switch.

In this case, after the charge pump circuit starts the normal switching operation, an electric charging current to the flying capacitor can be controlled.

The input switch may be arranged between the fourth switch and the output capacitor. The input switch may be arranged between a connection point between the first switch and the flying capacitor and the fourth switch.

In this case, after the charge pump circuit starts the normal switching operation, an electric charging current to the output capacitor can be controlled.

The input switch may include a plurality of MOSFETs connected in parallel to each other, and an ON-resistance may be switched by a combination of ON and OFF states of the MOSFETs.

The first and fourth switches are MOSFETs, and body diodes of the MOSFETs of the input switch may be arranged in a direction opposing the direction of body diodes of the first and fourth switches.

In this case, a leak current flowing from the first input terminal to the output capacitor can be interrupted.

The control circuit may further include a pulse modulator which generates the pulse signal the duty ratio of which is adjusted to make a feedback voltage depending on an output voltage from the charge pump circuit equal to a predetermined reference voltage. The pulse modulator may perform pulse width modulation in which a pulse width changes in a predetermined cycle.

When the pulse modulation is to be performed, immediately after the activation, an error between an output voltage and a target value thereof increases. For this reason, a feedback operation is performed to obtain the maximum electric charging capability to the output capacitor, and a rush current is easily generated. In this control system, since the input switch is arranged to make it possible to limit the electric charging capability to the output capacitor, the rush current can be preferably prevented.

Another embodiment of the present invention is a charge pump circuit. The charge pump circuit includes: a flying capacitor; an output capacitor; and any one of the above-described control circuits which control charging/discharging states of the flying capacitor and the output capacitor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In this specification, a "state in which a member A is connected to a member B" includes a case in which the member A and the member B are physically directly connected to each other and a case in which the member A and the member B are indirectly connected to each other through another member which does not influence an electric connection state.

Similarly, a "state in which a member C is arranged between the member A and the member B" also includes a case in which the member A and the member C or the member B and the member C are directly connected to each other and a case in which the member A and the member C or the member B and the member C are indirectly connected to each other through another member which does not influence an electric connection state.

Figure 1:
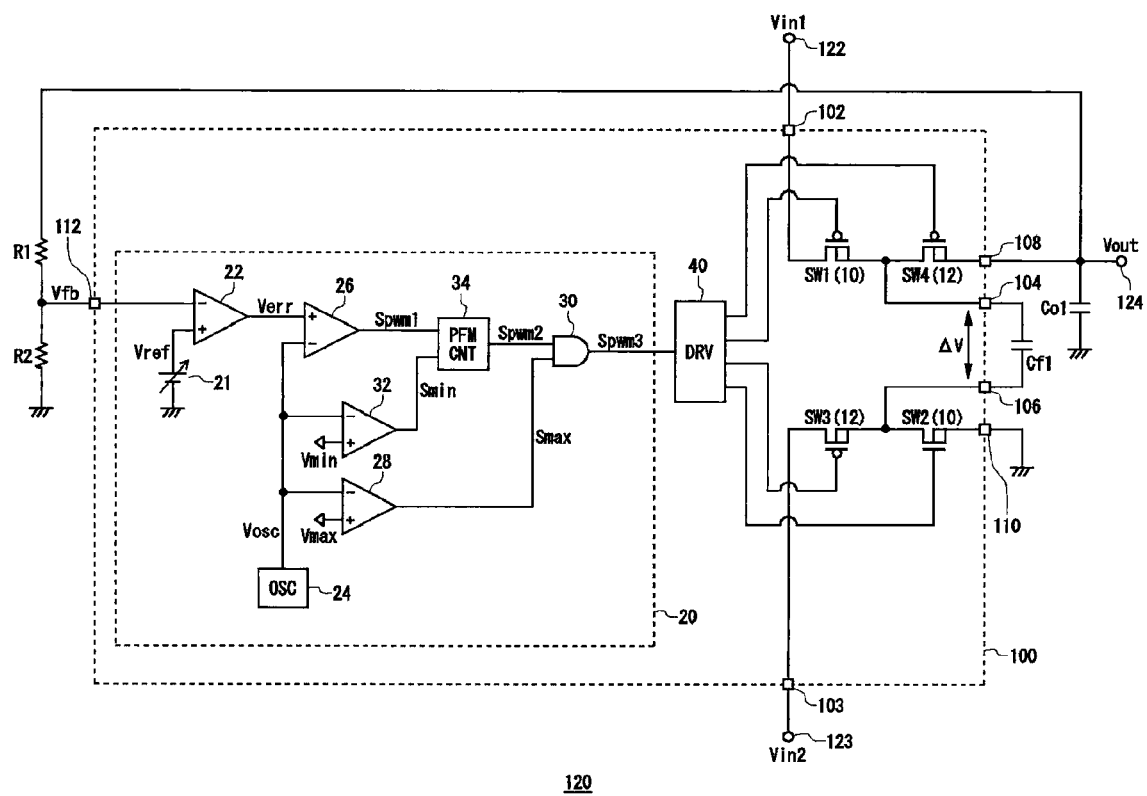
FIG. 1 is a circuit diagram showing a configuration of a charge pump circuit according to an embodiment of the present invention.

FIG. 1 is a circuit diagram showing a configuration of a charge pump circuit 120 according to an embodiment of the present invention. The charge pump circuit 120 adds a first input voltage Vin1 input to a first input terminal 122 to a second input voltage Vin2 input to a second input terminal 123 to output an output voltage Vout from an output terminal 124. As the input voltages Vin1 and Vin2, a battery voltage output from a battery (not shown) or a power supply voltage Vdd supplied from a power supply circuit. The present invention can be applied to a charge pump circuit having an arbitrary boost ratio. In order to facilitate understanding, an addition type (double boost ratio) charge pump circuit will be described below.

The charge pump circuit 120 includes a control circuit 100, a flying capacitor Cf1, an output capacitor Co1, and feedback resistors R1 and R2. Since the charge pump circuit in FIG. 1 has a double boost ratio, the charge pump circuit includes one flying capacitor Cf1 and one output capacitor Co1. However, when the charge pump circuit has another boost ratio or generates a plurality of output voltages, the charge pump circuit may include a plurality of flying capacitors or a plurality of output capacitors.

The control circuit 100 is a functional circuit that includes a first switch group 10, a second switch group 12, a pulse modulator 20, and a driver 40 and is integrated on one semiconductor substrate. The first input voltage Vin1 is applied to a first input terminal 102, the second input voltage Vin2 is applied to a second input terminal 103. The flying capacitor Cf1 is connected between a capacitor terminal 104 and a capacitor terminal 106, and the output capacitor Co1 is connected between the output terminal 108 and the ground. A ground terminal 110 is grounded, a feedback voltage Vfb depending on the output voltage Vout is input to a feedback terminal 112. The feedback voltage Vfb is a voltage obtained by dividing the output voltage Vout by the feedback resistor R1 and the feedback resistor R2.

In general, a charge pump circuit repeats a charging period $\phi 1$ for which a flying capacitor is charged and a discharging period $\phi 2$ for which an output capacitor is charged by using electric charge accumulated in the flying capacitor to generate a boosted voltage.

The first switch group 10 includes at least one switch arranged on a path which charges the flying capacitor Cf1 by using the first input voltage Vin1. The first switch group 10 and the flying capacitor Cf1 form a serial path arranged between the first input terminal 122 and the ground. In the embodiment, the first switch group 10 includes a first switch SW1 and a second switch SW2. More specifically, the first switch SW1 is arranged between the first input terminal 102 and the capacitor terminal 104, and the second switch SW2 is arranged between the capacitor terminal 106 and the ground terminal 110. The first switch SW1 is a P-channel MOSFET (Metal Oxide Semiconductor Field Effect Transistor), and the second switch SW2 is an N-channel MOSFET.

The second switch group 12 includes at least one switch arranged on a path which charges the output capacitor Co1 by using electric charge accumulated in the flying capacitor Cf1 in the charging period 41. In the embodiment, the second switch group 12 includes a third switch SW3 and a fourth switch SW4. More specifically, the third switch SW3 is arranged between the first input terminal 102 and the capacitor terminal 106, and the fourth switch SW4 is arranged between the capacitor terminal 104 and the output terminal 108. Both the third switch SW3 and the fourth switch SW4 are P-channel MOSFETs, respectively.

The driver 40 includes a level shift circuit, and switches the gate voltages of the first switch SW1 to the fourth switch SW4 to perform an ON/OFF control operation.

In the charging period $\phi 1$, when both the first switch SW1 and the second switch SW2 are turned on, the first input voltage Vin1 is applied to one end of the flying capacitor Cf1, and the other end is grounded. As a result, the flying capacitor Cf1 is charged with the first input voltage Vin1. A potential difference across both the ends of the flying capacitor Cf1 is given by $\Delta V$.

In the charging period $\phi 1$, when both the third switch SW3 and the fourth switch SW4 are turned on, a potential at the capacitor terminal 106 is equal to the second input voltage Vin2, and a potential at the capacitor terminal 104 is given by Vin2+$\Delta V$. When the potential at the capacitor terminal 104 is applied to the output capacitor Co1 through the fourth switch SW4 to charge the output capacitor Co1.

The driver 40 alternately repeats the charging period $\phi 1$ and the discharging period $\phi 2$ to boost an input voltage Vin. A conventional charge pump circuit allocates the charging period $\phi 1$ and the discharging period $\phi 2$ to a high level and a low level of a clock signal having a duty ratio of 50%, the charging period $\phi 1$ and the discharging period $\phi 2$ are fixed. In contrast to this, the charge pump circuit 120 according to the embodiment is characterized by adjusting the charging period $\phi 1$ and the discharging period $\phi 2$ by a feedback operation.

The pulse modulator 20 generates a pulse signal Spwm3 and supplies the pulse signal Spwm3 to the driver 40. The driver 40 allocates a high period TH of the pulse signal Spwm3 to any one of the charging period $\phi 1$ and the discharging period $\phi 2$ and allocates a low period TL to the other, and alternately turns on the first switch group 10 and the second switch group 12.

The feedback voltage Vfb depending on the output voltage Vout of the charge pump circuit 120 is input to the pulse modulator 20. A power supply 21 generates a reference voltage Vref. The pulse modulator 20 adjusts the duty ratio of the pulse signal Spwm3 such that the feedback voltage Vfb is equal to the predetermined reference voltage Vref. The duty ratio is a ratio of a cycle time Tp (=TH+TL) to the high period TH. In the embodiment, the pulse modulator 20 performs pulse width modulation.

In the driver 40, a dead time is set to prevent the first switch group 10 and the second switch group 12 from being simultaneously turned on, and a dead time at which both the first switch group 10 and the second switch group 12 are simultaneously turned off is preferably set near a positive edge and a negative edge of the pulse signal Spwm3. A method of setting the dead time may use a known art.

The pulse modulator 20 limits the duty ratio of a pulse signal Spwm1 within a predetermined range to adjust the duty ratio. A reason for the adjustment will be described below.

When the duty ratio of the pulse signal Spwm3 is 0%, the first switch group 10 is not turned on. For this reason, the flying capacitor Cf1 is not charged with the first input voltage Vin1. Therefore, charge transfer to the output capacitor Co1 is not performed, and a current supplying capability (driving capability) to a load (not shown) connected to the output terminal 124 becomes low (substantially 0).

When the duty ratio of the pulse signal Spwm3 increases within a certain range, the charging period $\phi 1$ to the flying capacitor Cf1 gets longer. Accordingly, an amount of electric charge accumulated in the flying capacitor Cf1 in the charging period $\phi 1$ increases, and a potential difference $\Delta V$ of the flying capacitor Cf1 immediately after the charging period $\phi 1$ increases.

As described above, the output capacitor Co1 in the discharging period $\phi 2$ is charged with a voltage given by Vin2+$\Delta V$. Therefore, when the potential difference $\Delta V$ of the flying capacitor Cf1 increases, an amount of electric charge supplied to the output capacitor Co1 in the discharging period $\phi 2$ increases. More specifically, with an increase in duty ratio of the pulse signal Spwm3, a current supplying capability to the load increases.

As the duty ratio of the pulse signal Spwm3 is increased, the charging period $\phi 1$ to the flying capacitor Cf1 gets longer. However, an upper limit value of the potential difference $\Delta V$ immediately after the charging period $\phi 1$ is the first input voltage Vin1. Here, a duty ratio obtained when the potential difference $\Delta V$ reaches the upper limit value is written by $\alpha$ %. When the duty ratio of the pulse signal Spwm3 increases over $\alpha$ %, the discharging period $\phi 2$ gets shorter in a state in which an amount of electric charge supplied to the flying capacitor Cf1 is constant in the charging period $\phi 1$. As a result, with the increase in duty ratio, an amount of electric charge supplied to the output capacitor Co1 decreases in the discharging period φ2. More specifically, as the duty ratio of the pulse signal Spwm3 increases over α %, a current supplying capability to a load decreases.

If the duty ratio of the pulse signal Spwm3 becomes 100%, electric charge transfer from the flying capacitor Cf1 to the output capacitor Co1 is not performed, and a current supplying capability to a load substantially becomes 0.

More specifically, the current supplying capability of the charge pump circuit 120 becomes minimum at duty ratios of 0% and 100%, and becomes maximum at the duty ratio of a %. In other words, at some duty ratio, the charge pump circuit has the maximum current supplying capability.

Therefore, when the output voltage Vout is monitored and the output voltage Vout decreases, i.e., when a load current increases, the current supplying capability of the charge pump circuit 120 increases. In contrast to this, when the output voltage Vout increases, i.e., when the load current decreases, a feedback operation is performed to decrease the current supplying capability of the charge pump circuit 120, so that the output voltage Vout can be held constant.

When the duty ratio of the pulse signal Spwm3 increases across a %, a feedback operation is performed in a such a direction that the output voltage Vout is deviated from a target value. For this reason, the output voltage Vout becomes unstable. Therefore, the charge pump circuit 120 according to the embodiment limits the duty ratio of the pulse signal Spwm3 within the predetermined range.

In this manner, in the charge pump circuit 120 according to the embodiment, the first switch group 10 and the second switch group 12 are controlled on the basis of the pulse signal Spwm3 the duty ratio of which is controlled within the range to make it possible to stabilize the output voltage Vout.

In a conventional charge pump circuit, when the first input voltage Vin1 and the second input voltage Vin2 are 10 V and 3.5 V, respectively, only the output voltage Vout of 13.5 V which is a sum of the first input voltage Vin1 and the second input voltage Vin2 can be output. Therefore, in order to obtain a desired voltage below 13.5 V, a linear regulator must be arranged on the input side or the output side of the charge pump circuit, and a circuit area increases. In contrast to this, in the charge pump circuit 120 according to the embodiment, since the output voltage Vout can be stabilized to a desired value without a regulator, a circuit area can be reduced.

When the regulator is arranged as in a conventional art, a power transistor is inserted on a path extending from an input terminal to which an input voltage is supplied to a load. For this reason, efficiency is deteriorated due to a power loss of a power transistor. In contrast to this, since the charge pump circuit 120 according to the embodiment does not need a power transistor, circuit efficiency can be improved.

Although the value α depends on capacitances of the flying capacitor Cf1 and the output capacitor Co1 and a frequency (cycle time Tp) of the pulse signal Spwm3, the value α is typically 50%. A case wherein α=50% will be described below. The predetermined range can be set to any one of:

(1) 0% to βmax %, and
(2) γmin % to 100%.

Feedback control operations in the ranges will be described below.

(1) First Control Method

The pulse modulator 20 modulates the pulse signal Spwm3 such that the high period TH gets longer when the feedback voltage Vfb is lower. At this time, an upper limit value βmax is set to the duty ratio of the pulse signal Spwm3, and the pulse signal Spwm3 is modulated such that the duty ratio changed within the range of 0% to the upper limit value βmax %.

βmax≦α is desirably set. In this case, since the duty ratio can be prevented from being changed across α, the output voltage Vout can be stabilized. When a ripple can be allowed to occur in the output voltage Vout, the βmax can be more largely set than α. In order to maximally increase the efficiency of the charge pump circuit, βmax=α is preferably set. When α=50%, the βmax is set at a maximum value within the range of 0% to 50% as much as possible.

When βmax=45%, the high period TH changes within the range of Tp×(0 to 0.45), and the low period TL changes within the range of Tp×(1 to 0.55). More specifically, the low period TL is limited to be longer than the high period TH. At this time, the driver 40 preferably turns on the first switch group 10 during a period corresponding to the high period TH of the pulse signal Spwm3, and preferably turns on the second switch group 12 during a period corresponding to the low period TL. More specifically, the driver 40 is preferably configured to elongate an ON-time of the second switch group 12. The reason for the long ON-time of the second switch group 12 will be described below.

A capacitance desired on the control circuit 100 side from the output terminal 124 will be considered. In the charging period φ1, since the fourth switch SW4 is turned off, and a capacitor connected to the output terminal 124 is only the output capacitor Co1. During the discharging period φ2, in addition to the output capacitor Co1, the flying capacitor Cf1 is connected. When a load current is constant, a fluctuation of the output voltage Vout decreases when the capacitance connected to the output terminal 124 is large.

Therefore, a time corresponding to the high period TH of the pulse signal Spwm3 can be allocated to the charging period φ1 to make the discharging period φ2 longer than the charging period φ1. For this reason, a ripple of the output voltage Vout can be decreased.

When the discharging period φ2 is longer, the ripple of the output voltage Vout can be advantageously decreased. However, when the capacitance of the output capacitor Co1 is large, or when the ripple can be allowed, the high period TH may be allocated to the discharging period φ2.

The control circuit 100 in FIG. 1 shows a configuration that executes a first control method. The pulse modulator 20 includes an error amplifier 22, an oscillator 24, a PWM (Pulse Width Modulation) comparator 26, an AND gate 30, a minimum duty comparator 32, a PFM (Pulse Frequency Modulation) controller 34, and a maximum duty comparator 28.

In the error amplifier 22, an inverted input terminal receives the feedback voltage Vfb, a non-inverted input terminal receives the reference voltage Vref, and an error between the two voltages is amplified. An output from the error amplifier 22 is called an error voltage Verr. The oscillator 24 outputs a cycle voltage Vosc having a triangular wave or a saw-tooth wave. In the PWM comparator 26, the non-inverted input terminal receives the error voltage Verr, and the inverted input terminal receives the cycle voltage Vosc. The PWM comparator 26 slices the cycle voltage Vosc by the error voltage Verr to output the pulse signal Spwm1 the level of which changes at a crossing point. A pulse width of the pulse signal Spwm1 is modulated to make the output voltage Vout to close to a target value.

The maximum duty comparator 28 receives the cycle voltage Vosc and a maximum voltage Vmax. The maximum duty comparator 28 slices the cycle voltage Vosc by the maximum voltage Vmax to generate a maximum pulse signal Smax having a predetermined duty ratio. The value of the maximum voltage Vmax is set such that the duty ratio of the maximum pulse signal Smax is equal to the value β.

The AND gate 30 receives a pulse signal Spwm2 output from the PFM controller 34 and the maximum pulse signal Smax to output a logical product of the two signals. An output from the AND gate 30, i.e., the duty ratio of the pulse signal Spwm3 is equal to the duty ratio of the pulse signal Spwm1 when the duty ratio of the pulse signal Spwm1 is βmax % or less, and is βmax % when the duty ratio of the pulse signal Spwm1 is βmax % or more. In order to limit the duty ratio of the pulse signal Spwm3, another circuit configuration may be used, and the form of the circuit configuration is not limited to a specific form.

The pulse modulator 20 compares the duty ratio of the pulse signal Spwm1 with a predetermined lower limit value βmin. When the duty ratio of the pulse signal Spwm1 is smaller than the lower limit value βmin, a level of the pulse signal Spwm1, and the switching operations of the first switch group 10 and the second switch group 12 are stopped. More specifically, no pulse is output from the pulse modulator 20. For this reason, the minimum duty comparator 32 and the PFM controller 34 are arranged.

When the duty ratio of the pulse signal Spwm3 is smaller than the lower limit value βmin, the pulse modulator 20 desirably fixes a level of the pulse signal Spwm3 to turn on the second switch group 12. The reason will be described below.

The minimum duty comparator 32 receives the cycle voltage Vosc and a minimum voltage Vmin. The minimum duty comparator 32 slices the cycle voltage Vosc by the minimum voltage Vmin to generate a minimum pulse signal Smin having a predetermined duty ratio. The value of the minimum voltage Vmin is set such that the duty ratio of the minimum pulse signal Smin is about 20%.

The PFM controller 34 receives the pulse signal Spwm1 and the minimum pulse signal Smin and compares the duty ratio of the two signals with each other. When the duty ratio of the pulse signal Spwm1 is smaller than the duty ratio of the minimum pulse signal Smin, the duty ratio of the pulse signal Spwm2 is fixed to a low level. When the duty ratio of the pulse signal Spwm1 is larger than the duty ratio of the minimum pulse signal Smin, the pulse signal Spwm2 is equal to the pulse signal Spwm1.

An order of the AND gate 30 and the PFM controller 34 may be reversed.

Figure 2:
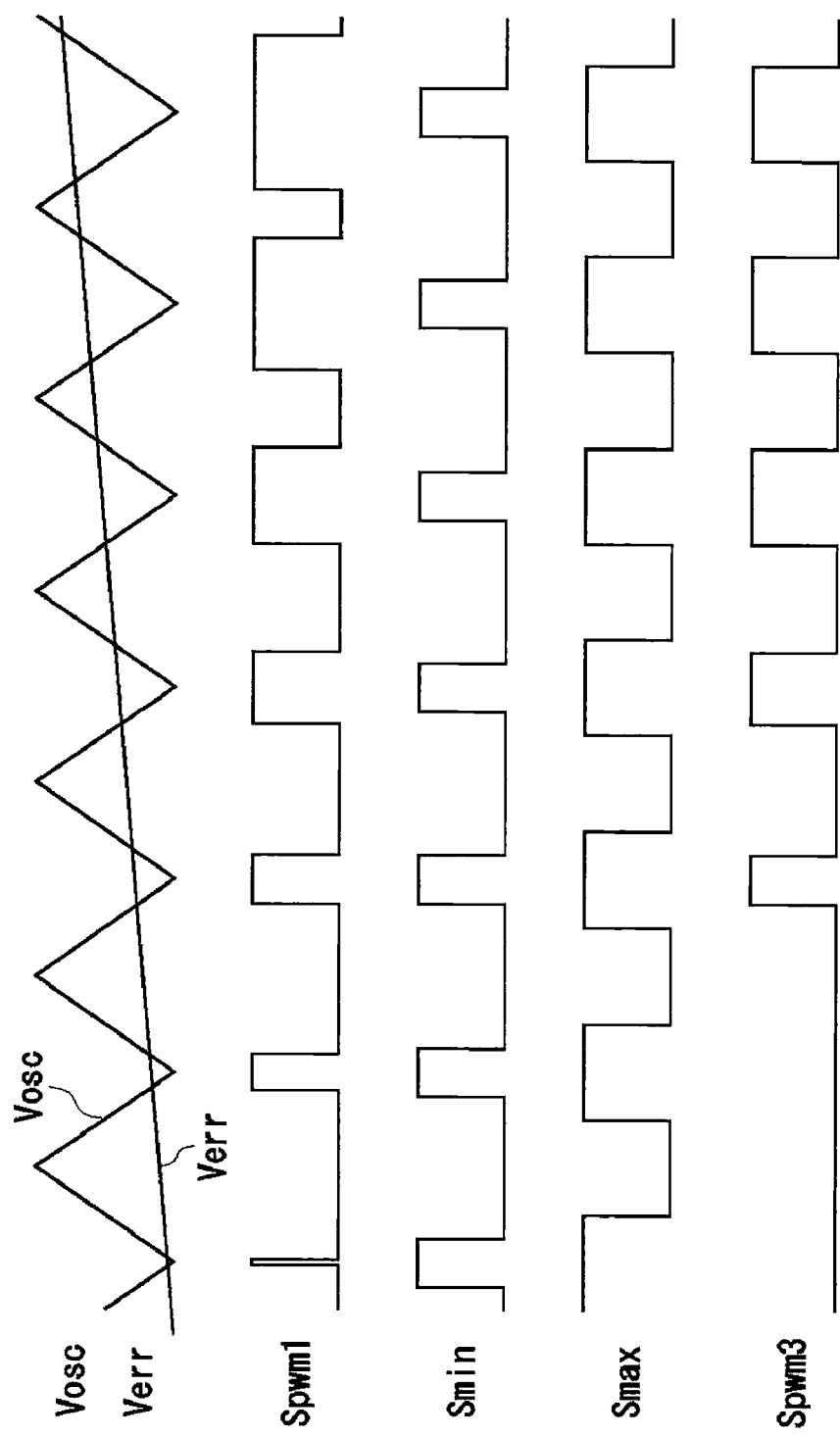
FIG. 2 is a signal waveform chart of the charge pump circuit in FIG. 1.

An operation of the charge pump circuit 120 configured as described above will be described below. FIG. 2 is a signal waveform chart of the charge pump circuit 120 in FIG. 1. In the waveform chart described in this specification, to simplify descriptive, or to facilitate understanding, the ordinate and the abscissa are appropriately enlarged or reduced.

With an increase in load current, a larger amount of electric charge is supplied from the output capacitor Co1 to a load. For this reason, the output voltage Vout drops, and the error voltage Verr raises. However, the duty ratio of the pulse signal Spwm3 is limited to the duty ratio max of the maximum pulse signal Smax or less. When the duty ratio of the pulse signal Spwm1 is smaller than the duty ratio βmin of the minimum pulse signal Smin, the pulse signal Spwm3 is fixed to a low level, and a pulse is cut.

Figure 3A:
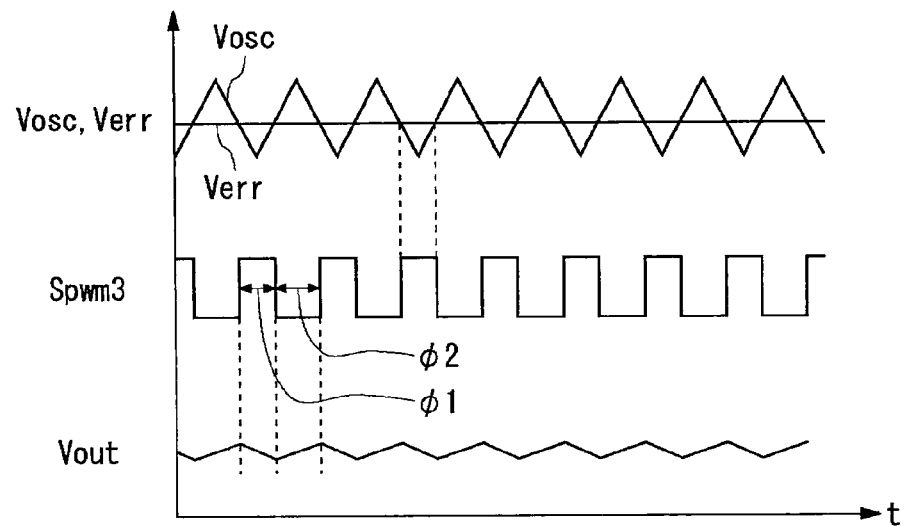
FIGS. 3A and 3B are operation waveform charts of the charge pump circuit in FIG. 1 in a normal load state and a reduced load state, respectively.
Figure 3B:
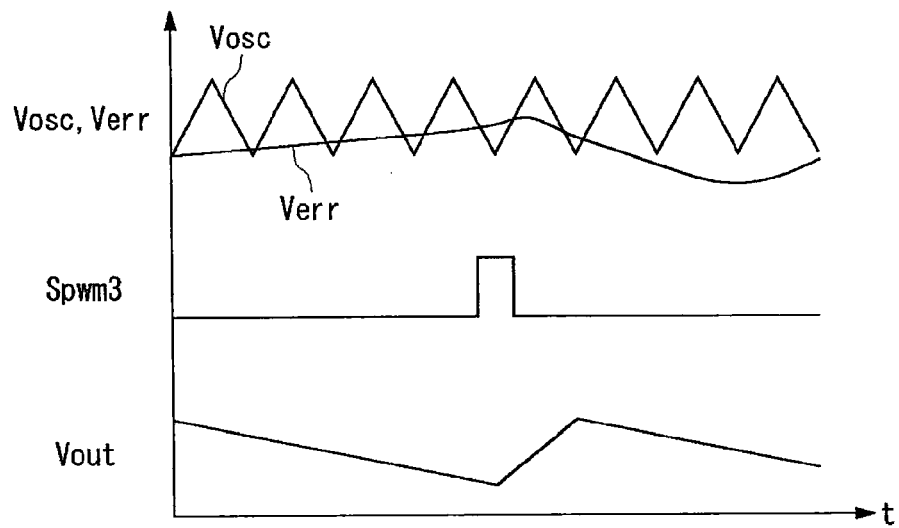

FIGS. 3A and 3B are operation waveform charts of the charge pump circuit 120 in a normal load state and a light load state.

As shown in FIG. 3A, when a load current is large to some extend and has a predetermined value, a duty ratio of the pulse signal Spwm1 is adjusted by a feedback operation. The first switch group 10 is turned on during the charging period ϕ1 in which the pulse signal Spwm3 is set at a high level, and the second switch group 12 is turned on during the discharging period ϕ2 in which the pulse signal Spwm1 is set at a low level. During the charging period ϕ1, since a load current flows from the output capacitor Co1, the output voltage Vout decreases. During the discharging period ϕ2, the output voltage Vout raises because the output capacitor Co1 is charged by using the flying capacitor Cf1. The charging period ϕ1 and the discharging period ϕ2 are repeated, so that the output voltage Vout is stabilized near a target value while slightly being fluctuated.

FIG. 3B shows the operation in a low load state. In the low load state, the duty ratio of the pulse signal Spwm1 is smaller than the minimum duty value βmin. As a result, since the switching operations of the first switch group 10 and the second switch group 12 are stopped, a charging operation of the output capacitor Co1 is stopped. Meanwhile, the output capacitor Co1 is discharged with a small load current. For this reason, the output voltage Vout moderately decreases. With the decrease of the output voltage Vout, the error voltage Verr raises. When the duty ratio of the pulse signal Spwm1 exceeds the minimum duty ratio βmin at time t1, the pulse signal Spwm3 is set at a high level, and the charging period ϕ1 is started. In the discharging period ϕ2 immediately after the charging period ϕ1, the output capacitor Co1 is charged, and the output voltage Vout raises. When the output voltage Vout raises, the error voltage Verr decreases again, the duty ratio is smaller than the minimum duty ratio βmin, and the switching operation is stopped.

As described above, in the charge pump circuit 120 according to the embodiment, the duty ratio of the pulse signal Spwm3 is monitored, and a pulse lower than the lower limit value βmin is cut, so that an operation can be performed in an intermittent mode in a low load state. In order to switch the ON and OFF states of the first switch group 10 and the second switch group 12, a drive current to charge or discharge the gate capacitances of the transistors are necessary. However, when the operation is performed in the intermittent mode, a drive current is reduced. For this reason, a current consumption of the charge pump circuit 120 can be reduced.

Furthermore, in the light load state, when the pulse signal Spwm3 is fixed to a low level, the circuit is stopped in a state in which the second switch group 12 is turned on. Therefore, since a combined capacitors of the flying capacitor Cf1 and the output capacitor Co1 is connected to the output terminal 124, a ripple of the output voltage Vout can be decreased.

However, the present invention is not limited to the configuration, and the pulse signal Spwm3 may be fixed to a high level in the light load state.

Although the ripple of the output voltage Vout shown in FIG. 3B is larger than that in FIG. 3A, the ripple is actually equal to or smaller than that. This is because an amount of electric discharge from the output capacitor Co1 is small in a light load state having a load current and a decrease of the output voltage Vout is also small.

The above operation is the operation of the charge pump circuit 120 according to the embodiment. It should be noted that a pulse modulation technique of the charge pump circuit 120 is different from a pulse modulation technique of a switching regulator in idea. More specifically, when pulse width modulation is performed in a boost type switching regulator, a duty ratio Dsr of a pulse signal to be generated is given by:

$$Dsr = 1 - Vin/Vout$$

More specifically, the duty ratio of the pulse signal is adjusted depending on the input voltage Vin and the target value Vout of the output voltage.

In contrast to this, in pulse modulation of the charge pump circuit 120 according to the embodiment, the duty ratio of the pulse signal Spwm3 is different from that in the pulse modulation of the switching regulator because the duty ratio of the pulse signal Spwm3 is determined depending on a load current.

In the switching regulator, when a duty ratio is increased, a feedback operation is performed in a direction in which the output voltage Vout increases. However, in the charge pump circuit, when the duty ratio exceeds a certain boundary value, the direction of the feedback operation is reversed. For this reason, in the charge pump circuit 120 according to the embodiment, the duty ratio is limited within the duty ratio of the pulse signal Spwm3.

(2) Second Control Method

In the first control method, a pulse signal is modulated such that the high period TH gets longer as the feedback voltage Vfb is lower. In contrast to this, in the second control method, the pulse signal Spwm3 is modulated such that the low period TL gets longer as the feedback voltage Vfb is lower. Furthermore, a lower limit value γmin is set in the duty ratio of the pulse signal Spwm3, and the pulse signal Spwm3 is modulated such that the duty ratio of the pulse signal Spwm3 changes within the range of the lower limit value γmin % to 100%.

At this time, γmin≧α is desirably set. In this case, since a change of the duty ratio over α can be prevented, the output voltage Vout can be stabilized. However, when a ripple can be allowed to be generated in the output voltage Vout, γmin may be smaller than α.

In order to maximize the efficiency of the charge pump circuit, γmin=α is preferably satisfied. When α=50, γmin is set at a minimum value within the range of 50% to 100% as much as possible.

When γmin=55%, the high period TH changes within the range of Tp×(0.55 to 1), and the low period TL changes within the range of Tp×(0.45 to 0). More specifically, the high period TH is limited to be longer than the low period TL. At this time, the driver 40 preferably turns on the first switch group 10 during a period corresponding to the low period TL of the pulse signal Spwm3, and preferably turns on the second switch group 12 during a period corresponding to the high period TH. More specifically, the driver 40 is preferably configured to elongate an ON-time of the second switch group 12. In this manner, the ripple of the output voltage Vout can be reduced.

In order to realize the second control method, the control circuit 100 in FIG. 1 may be modified. For example, the reference voltage Vref may be input to the inverted input terminal of the error amplifier 22, and the feedback voltage Vfb may be input to the non-inverted input terminal. In this case, when a load current is small, i.e., when the output voltage Vout is large, the error voltage Verr increases, and the duty ratio of the pulse signal Spwm1 gets close to 100%. As a result, a current supplying capability to the load decreases, and an appropriate feedback operation can be performed. When the load current increases, the duty ratio gets close to α, and the current supplying capability increases.

In this case, the maximum duty comparator 28 generates a pulse signal the duty ratio of which is γmin, the duty ratio of the pulse signal Spwm3 may be limited to be γmin or more.

In the second control method, in order to realize an intermittent mode in a light load state, the upper limit value γmax is set in the duty ratio of the pulse signal Spwm3. When the duty ratio of the pulse signal Spwm3 is larger than the upper limit value γmax, the level of the pulse signal Spwm3 is fixed. In this case, the minimum duty comparator 32 may generate a pulse signal the duty ratio of which is γmax.

Even in the second control method, the same effect as in the first control method can be obtained.

In the charge pump circuit including a part or all of the characteristic features of the charge pump circuit 120, a technique that prevents a rush current flowing into an output capacitor in activation will be described below.

(First Technique)

The driver 40 does not perform a switching operation between the charging period φ1 and the discharging period φ2 during a predetermined precharge period after the start of activation of the charge pump circuit 120. In place of this, the driver 40 turns on the first switch SW1 and the fourth switch SW4 to charge the output capacitor Co1.

Thereafter, at the end of the precharge period, the charging period φ1 and the discharging period φ2 are alternately switched, and a first pair (the first switch SW1 and the second switch SW2) and a second pair (the third switch SW3 and the fourth switch SW4) are alternately turned on and off.

When the precharge period is provided, the following effect is obtained.

If a switching operation is started without providing the precharge period, the flying capacitor Cf1 is charged to ΔV during the charging period φ1. Thereafter, a voltage given by ΔV+Vin2 is applied to the output capacitor Co1. Immediately after the activation, an error between the output voltage Vout and the reference voltage Vref is large. For this reason, since a charging time of the flying capacitor Cf1 is maximum, ΔV≈Vin1 may be satisfied. In this manner, the subsequent discharging period φ2, a high voltage close to the voltage given by Vin1+Vin2 is applied to the output capacitor Co1 when an amount of electric charge is 0, and a rush current may flow in the output capacitor Co1. Immediately after the fourth switch SW4 is turned on, a voltage Vin1+Vin2 is applied to one end (flying capacitor Cf1 side) of the fourth switch SW4, and 0 V is applied to the other end (output capacitor side). For this reason, the voltage higher than the withstand voltage of the fourth switch SW4 may be applied to the fourth switch SW4. This state may influence the reliability of a circuit device.

In contrast to this, a precharge period is set, and the first switch SW1 and the fourth switch SW4 are turned on to input the first input voltage Vin1 in the output capacitor Co1 immediately after the activation. Therefore, in comparison with a status in which the voltage Vin1+Vin2 is applied to the output capacitor Co1, generation of a rush current can be suppressed.

In the precharge period, the first input voltage Vin1 is applied across both the ends of the first switch SW1 and the fourth switch SW4. Therefore, in comparison with the status in which the voltage Vin1+Vin2 is applied to the output capacitor Co1, the reliability of the device can be improved.

(Second Technique)

In the precharge period, the second switch SW2 and the third switch SW3 are desirably set to the following states.

2-1. When First Input Voltage Vin1 is Higher than Second Input Voltage Vin2

In this case, the driver 40 turns on, in addition to the first switch SW1 and the fourth switch SW4, the third switch SW3 and turns off the second switch SW2 during the precharge period. In this state, the flying capacitor Cf1 is charged with a difference voltage (Vin1−Vin2) between the first input voltage Vin1 and the second input voltage Vin2. More specifically, ΔV=(Vin1−Vin2) is satisfied.

A switching operation is started after the end of the precharge period. When the third switch SW3 and the fourth switch SW4 are turned on during the discharging period φ2, a voltage given by:

$Vin2+\Delta V=Vin2+(Vin1-Vin2)=Vin1$ is applied to the output capacitor Co1. More specifically, in transition from the precharge period to the switching operation, a large voltage can be prevented from being applied to the output capacitor Co1.

If the third switch SW3 is turned off, the second switch SW2 is turned on, and the first input voltage Vin1 is charged with the flying capacitor Cf1 during the precharge period, $\Delta V=Vin1$ is satisfied. Therefore, in the discharging period φ2 after the start of the switching operation, a large voltage given by:

$Vin2+\Delta V=Vin2+Vin1$ is undesirably applied to the output capacitor Co1.

2-2. When First Input Voltage Vin1 is Equal to Second Input Voltage Vin2

In this case, the driver 40 turns off the second switch SW2 during the precharge period. The third switch SW3 may be set in an ON or OFF state. When the second switch SW2 is set in an OFF state, the flying capacitor Cf1 is not charged with the first input voltage Vin1. For this reason, immediately after the start of the switching operation, a large voltage can be prevented from being applied to the output capacitor Co1.

(Third Technique)

The first and second techniques are preferably combined to each other to cause the pulse modulator 20 to execute a soft start which raises the reference voltage Vref with time after the end of the precharge period.

Figure 4:
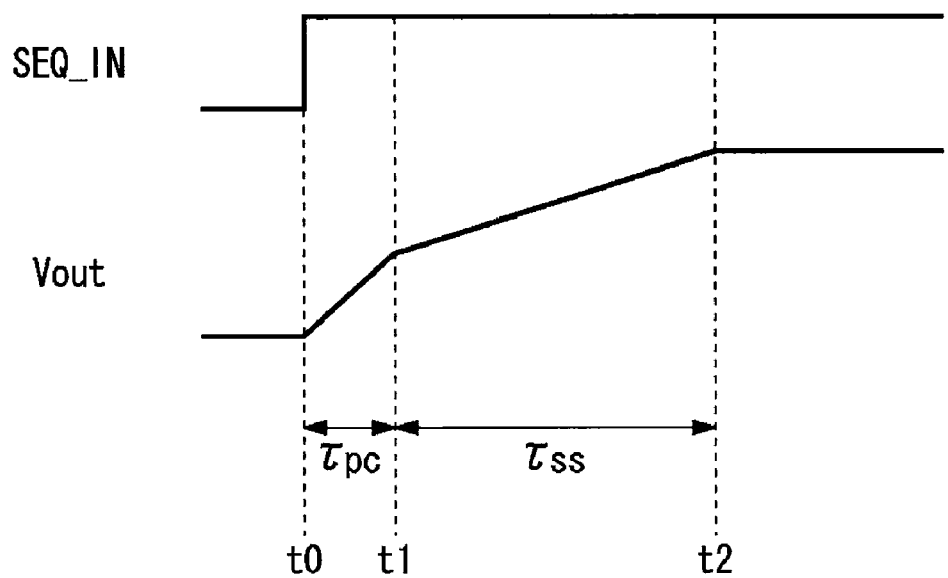
FIG. 4 is a time chart showing an operation state of the charge pump circuit in FIG. 1 in activation.

An operation performed when the first and second techniques are combined to each other to activate the charge pump circuit 120 will be described below. FIG. 4 is a time chart showing an operation state in activation of the charge pump circuit 120 in FIG. 1.

At time t0, a sequence start signal (to be referred to as SEQ_IN signal) indicating the start of activation of the charge pump circuit 120 goes to a high level. When the SEQ_In signal goes to a high level, the driver 40 turns on the first switch SW1 and the fourth switch SW4 during a precharge period τpc to charge the output capacitor Co1 with the first input voltage Vin1. As a result, the output voltage Vout increases with time.

The operation is switched to a soft-start operation at time t1 after the precharge period τpc has elapsed. In the soft-start operation, the driver 40 alternately switches the charging period φ1 and the discharging period φ2 on the basis of the pulse signal Spwm3. In the soft-start operation, the power supply 21 moderately raises the reference voltage Vref with time. The output voltage Vout raises by feedback in accordance with the reference voltage Vref.

Thereafter, when the reference voltage Vref reaches a target value at time t3, the output voltage Vout becomes stable.

In this manner, according to the charge pump circuit 120 in FIG. 1, the output voltage Vout can be raised while suppressing a rush current.

(Fourth Technique)

A fourth technique relates to a technique that is combined to at least one of the first to third techniques or singularly used to effectively suppress a rush current.

Figure 5:
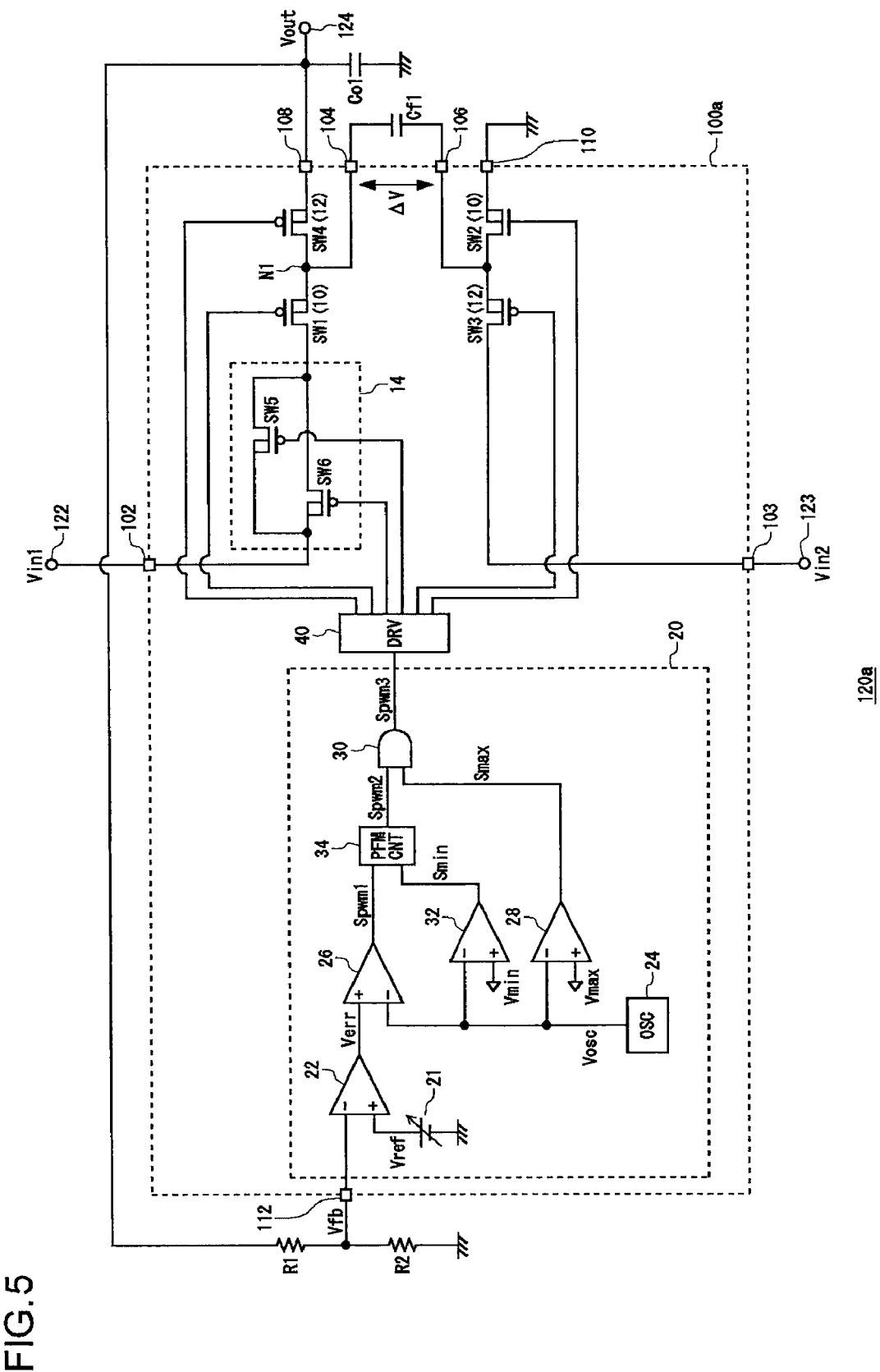
FIG. 5 is a circuit diagram showing a configuration of a charge pump circuit according to a modification.

FIG. 5 is a circuit diagram showing a configuration of a charge pump circuit 120a according to a modification. The charge pump circuit 120a in FIG. 5 includes, in addition to the charge pump circuit 120 in FIG. 1, an input switch 14. The driver 40 controls, in addition to the first switch SW1 to the fourth switch SW4, a state of the input switch 14.

The input switch 14 is arranged on a path extending from the first input terminal 102 to the output capacitor Co1 through the output terminal 108, and is configured to make ON-resistances switchable. In FIG. 5, the input switch 14 is arranged between the first switch SW1 and the first input terminal 102.

The driver 40 turns on the input switch 14 at a high ON-resistance during a predetermined soft-start period τss after the start of activation of the charge pump circuit 120a. Thereafter, the ON-resistance of the input switch 14 is switched to a low state. The soft-start period τss may be equal to the precharge period τpc, longer than the precharge period τpc, or shorter than the precharge period τpc. The following explanation will be performed on the assumption that τss>τpc is satisfied.

The input switch 14 includes a fifth switch SW5 of a parallel connected P-channel MOSFET and a sixth switch SW6 of the P-channel MOSFET. An ON-resistance of the fifth switch SW5 is designed to be high, and an ON-resistance of the sixth switch SW6 is designed to be sufficiently small not to generate a loss in a normal switching operation.

the driver 40 turns on only the fifth switch SW5 during the soft-start period τss. After the soft-start period τss has elapsed, in addition to the fifth switch SW5, or in place of the fifth switch SW5, the sixth switch SW6 is turned on.

The following effect can be obtained by arranging the input switch 14.

In the control circuit 100 in FIG. 1, during the precharge period τss, the first switch SW1 and the fourth switch SW4 are turned on. Therefore, if the ON-resistances of the first switch SW1 and the fourth switch SW4 are very small, or if the first input voltage Vin1 is very high, a rush current may flow in the output capacitor Co1. In this case, the input switch 14 is arranged to set a high resistance on a path extending from the first input terminal 102 to the output terminal 108 in the precharge period τpc to make it possible to preferably prevent a rush current.

When τss>τpc is satisfied, even after the transition to the soft-start operation, the ON-resistance of the input switch 14 is set to be high. Therefore, even though the switching operation is started at the low output voltage Vout, a rush current can be preferably prevented from flowing. Thereafter, after the soft-start period τss has elapsed, the ON-resistance of the input switch 14 is set to be low, and the switching operation is performed with a small loss.

Figure 6:
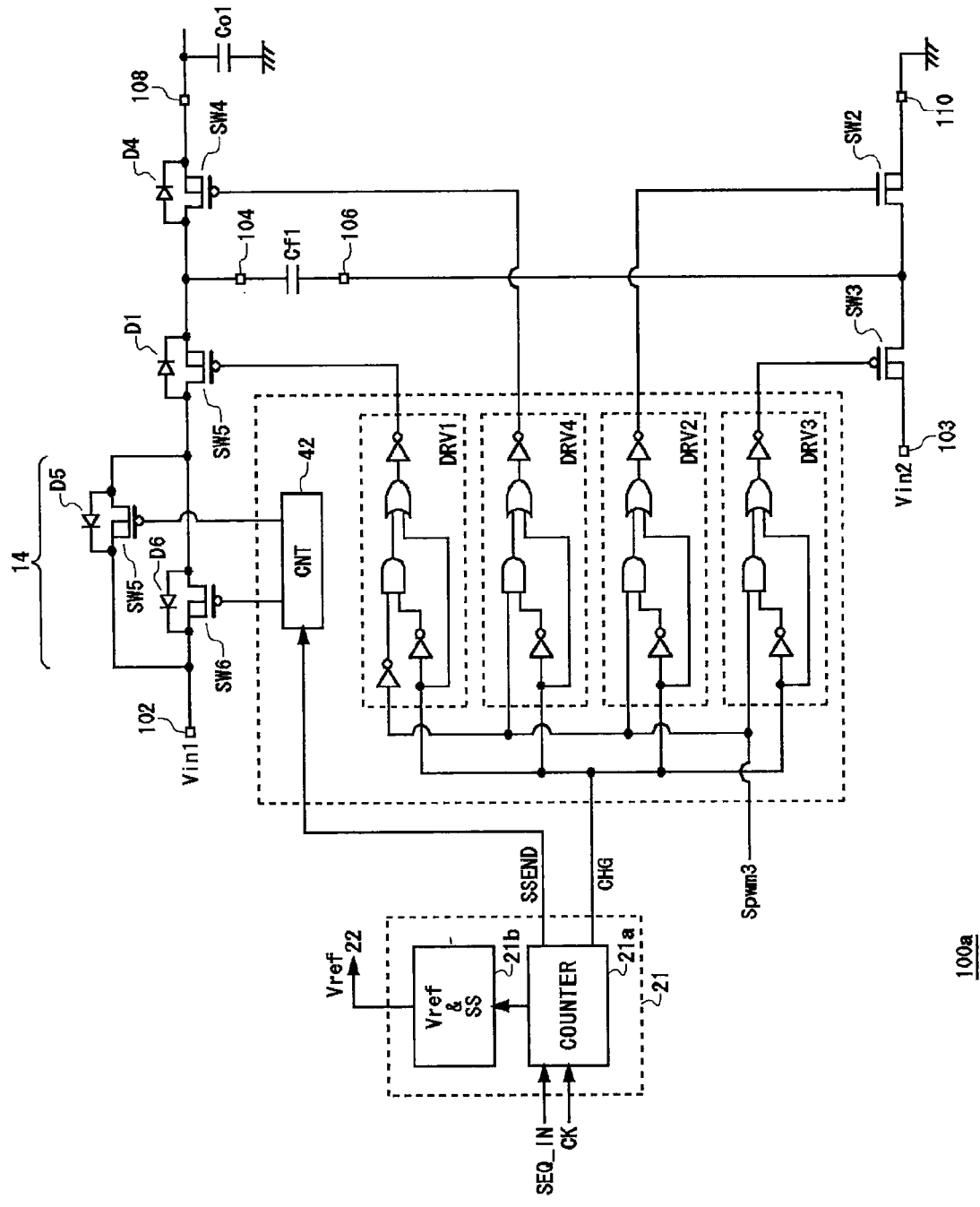
FIG. 6 is a circuit diagram showing a configuration of a control circuit in FIG. 5.

FIG. 6 is a circuit diagram showing a configuration of a control circuit 100a in FIG. 5. In the control circuit 100a in FIG. 6, only the configurations of the power supply 21 and the driver 40 are described in detail. FIG. 21 includes a counter 21a and a power supply 21b. The counter 21a receives an SEQ_In signal and a clock CK. When the SEQ_IN signal goes to a high level, the counter 21a starts a count operation by using the clock CK to measure the precharge period τpc and the soft-start period τss.

After the precharge period τpc has elapsed from the start of activation, the counter 21a switches a charge signal (to be referred to a CHG signal hereinafter) from a high level to a low level. At time after the soft-start period τss has elapsed from the start of activation, the counter 21a switches a soft-start end signal (to be referred to as an SSEND signal hereinafter) from a high level to a low level.

The driver 40 includes a control unit 42 and a first driver DRV1 to a fourth driver DRV4.

The control unit 42 turns on the fifth switch SW5 and turns off the sixth switch SW6 during the period (soft-start period τss) in which the SSEND signal is set at a high level. In a period in which the SSEND signal is set at a low level, both the fifth switch SW5 and the sixth switch SW6 are turned on.

The first driver DRV1 to the fourth driver DRV4 receive the pulse signal Spwm3 and the CHG signal to drive the first switch SW1 to the fourth switch SW4, respectively. More specifically, the first driver DRV1, the third driver DRV3, and the fourth driver DRV4 turn on the first switch SW1, the third switch SW3, and the fourth switch SW4, respectively, when the CHG signal is set at a high level. The second driver DRV2 turns off the second switch SW2 when the CHG signal is set at a high level.

The first driver DRV1 to the fourth driver DRV4 switch the first switch SW1 to the fourth switch SW4, respectively, on the basis of the pulse signal Spwm3 when the CHG signal is set at a low level. More specifically, the first driver DRV1 and the second driver DRV2 turn on the first switch SW1 and the second switch SW2, respectively, when the pulse signal Spwm3 is set at a low level, and turn off the first switch SW1 and the second switch SW2, respectively, when the pulse signal Spwm3 is set at a high level. In contrast to this, the third driver DRV3 and the fourth driver DRV4 turn on the third switch SW3 and the fourth switch SW4, respectively, when the pulse signal Spwm3 is set at a high level, and turn off the third switch SW3 and the fourth switch SW4, respectively, when the pulse signal Spwm3 is set at a low level.

Body diodes D1 and D4 of the first switch SW1 and the fourth switch SW4 are connected such that the cathodes of both the body diodes D1 and D4 are on the output terminal 108 side and the anodes are on the first input terminal 102 side. Therefore, in the circuit in FIG. 1, even though the first switch SW1 and the fourth switch SW4 are turned off, a current path is present to extend from the first input terminal 102 to the output terminal 108. More specifically, the first input voltage Vin1 cannot be interrupted, a leak current is generated to cause a power loss. In FIG. 6, both the fifth switch SW5 and the sixth switch SW6 are P-channel MOS-FETs, respectively. The body diodes D5 and D6 are connected in a direction opposing the direction of the body diodes D1 and D4. Therefore, when the switches SW1, SW4, SW5, and SW6 are turned off, a current path extending from the first input terminal 102 to the output terminal 108 can be completely interrupted.

Figure 7:
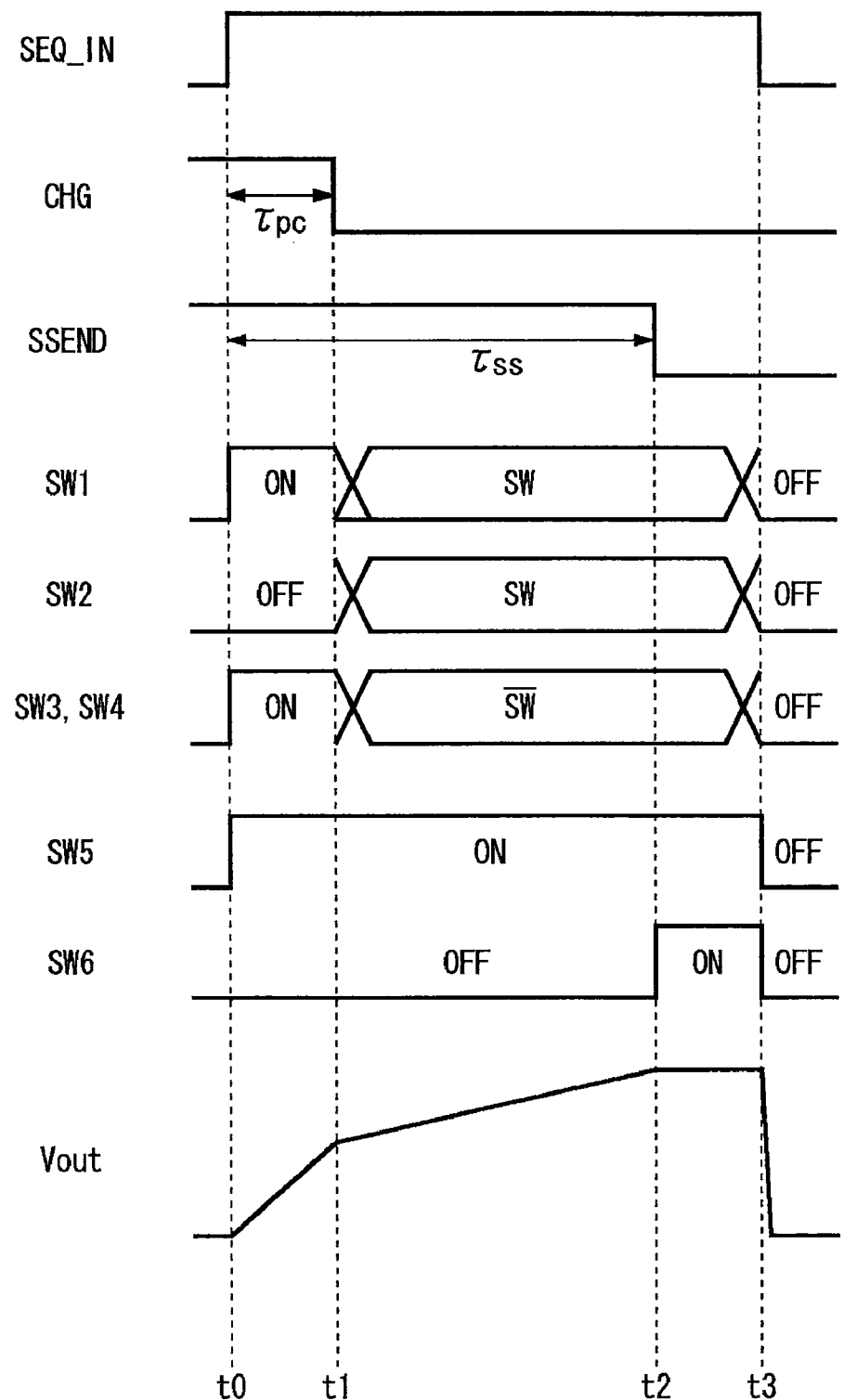
FIG. 7 is a time chart showing an operation state of a control circuit in FIG. 6.

FIG. 7 is a time chart showing an operation state of the control circuit 100a in FIG. 6. When the SEQ_IN signal goes to a high level at time t0, the start of activation of the charge pump circuit 120 is designated. In a period from time t0 to the precharge period τpc, the CHG signal is at a high level, and the first switch SW1, the third switch SW3, and the fourth switch SW4 are turned on. The fifth switch SW5 is turned on, and the sixth switch SW6 is turned off. As a result, the first input voltage Vin1 is applied to the output capacitor Co1 through the fifth switch SW5, the first switch SW1, and the fourth switch SW4, and the output voltage Vout raises.

When the CHG signal goes to a low level at time t1, the first switch SW1 to the fourth switch SW4 start switching operations. After time t1, the reference voltage Vref moderately raises, and a soft-start operation is performed. At this time, only the fifth switch SW5 is in an ON state, and the sixth switch SW6 is in an OFF state. More specifically, during a period from time t1 to time t2, the soft-start operation which moderately raises the reference voltage Vref. Furthermore, the ON-resistance of the input switch 14 is set to be high to limit a charging capability from the first input terminal 102 to the flying capacitor Cf1, so that the output voltage Vout moderately raises.

When the SSEND signal goes to a low level at time t2, the sixth switch SW6 is turned on, and a current supplying capability from the first input terminal 102 is maximum to make a load drivable. Thereafter, when the SEQ_IN signal goes to a low level at time t3, at least the first switch SW1 and the fourth switch SW4 are turned off.

In this manner, according to the control circuit 100a in FIGS. 5 and 6, independently of the switching devices (SW1 to SW4), a switch the ON-resistance of which can be adjusted is arranged on a path extending from the first input terminal 102 to the output capacitor Co1 through the output terminal 108, and the ON-resistances are switched depending on an activation sequence to make it possible to limit a charging capability to the output capacitor Co1 or the flying capacitor Cf1, and a rush current can be prevented.

More specifically, according to the fourth technique in which the input switch 14 is arranged, the following effects can be obtained.

(Effect 1) When Fourth Technique is Combined to First Technique

When the first switch SW1 and the fourth switch SW4 are turned on in the precharge period τpc immediately after the start of activation of the charge pump circuit 120a, the ON-resistance of the input switch 14 is set to be high to make it possible to increase an impedance of a charging path extending from the first input terminal 102 to the output capacitor Co1 through the input switch 14, the first switch SW1, and the fourth switch SW4, and a rush current can be prevented from flowing in the output capacitor Co1.

(Effect 2) when Fourth Technique is Combined to First Technique or Singularly Used When switching operations of the first switch SW1 to the fourth switch SW4 are performed after precharging which turns on the first switch SW1 and the fourth switch SW4 is not performed or after the precharging is performed, the ON-resistance of the input switch 14 is set to be high, an impedance of a charging path extending from the first input terminal 102 to the flying capacitor Cf1 through the input switch 14 and the first switch SW1 can be increased, and a charging current to the flying capacitor Cf1 can be limited. As a result, an amount of electric charge accumulated in the flying capacitor Cf1 can be limited in the charging period φ1, the output voltage Vout can be moderately raised.

(Effect 3) In order to moderately raise the output voltage Vout, the fourth technique is effectively combined to the third technique to execute the soft start which moderately raises the reference voltage Vref in the pulse modulator 20 while controlling the ON-resistance of the input switch 14.

The charge pump circuit 120 according to the embodiment is described above. It is conceivable for a person skilled in the art that the above embodiments are illustrative, and various modifications of combinations of the constituent elements and the processing processes in the embodiments can be effected and that these modifications are included in the spirit and scope of the invention. The modifications will be described below.

In the explanation in FIGS. 5 and 6, the input switch 14 is arranged between the first switch SW1 and the first input terminal 102. The present invention is not limited to the configuration.

Since the input switch 14 may be arranged on a path extending from the first input terminal 102 to the output terminal 108, the following modifications are available.

Modification 1. The input switch 14 may be arranged between a connection point N1 between the fourth switch SW4 and the flying capacitor Cf1 and the first switch SW1.

Modification 2. The input switch 14 may be arranged between the fourth switch SW4 and the output capacitor Co1.

Modification 3. The input switch 14 may be arranged between a connection point N1 between the first switch SW1 and the flying capacitor Cf1 and the fourth switch SW4.

In Modification 1, as in the case in FIG. 5 or 6, after the charge pump circuit 120a starts a normal switching operation, a charging current to the flying capacitor Cf1 can be controlled.

In Modifications 2 and 3, after the charge pump circuit 120a starts the normal switching operation, a charging current to the output capacitor Co1 can be controlled.

The configuration of the charge pump circuit is not limited to topologies in FIGS. 1, 5 and 6. For example, diodes may be used in place of the switches of the transistors. In the embodiments, the addition type charge pump circuit which adds two input voltages is described. However, a charge pump circuit having a double boost ratio may be used. The first input terminal 102 and the second input terminal 103 must be merely commonly connected.

Another charge pump circuit having a 1.5-fold or 4-fold boost ratio, or a charge pump circuit which can switch a plurality of boost ratios may be used. Furthermore, the present invention can also be applied to a voltage-inversion type charge pump circuit to generate a negative voltage.

In the explanations of the embodiments, the first switch SW1 to the fourth switch SW4 and the input switch 14 are built in the control circuit 100. However, the first switch SW1 to the fourth switch SW4 and the input switch 14 may be arranged outside the control circuit 100 by using a discrete device.

In the explanations of the embodiments, the pulse modulator 20 performs pulse width modulation which slices a triangular wave or a saw-tooth wave to generate a pulse signal. A modulating method is not limited to the method in the embodiments. For example, pulse frequency modulation or pulse density modulation may be performed. More specifically, a duty ratio of a pulse signal may be adjusted such that the output voltage Vout is close to a target voltage, and the duty ratio may be limited within a predetermined range.

Logical levels of the signals are not limited to those in the embodiments, and can be arbitrarily inverted.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a charge pump circuit including a flying capacitor and an output capacitor, comprising:
   a first switch arranged between a first input terminal to which a first input voltage is applied and one end of the flying capacitor;
   a second switch arranged between the other end of the flying capacitor and a fixed voltage terminal;
   a third switch arranged between a second input terminal to which a second input voltage is applied and the other end of the flying capacitor;
   a fourth switch arranged between the one end of the flying capacitor and one end of the output capacitor; and
   a driver which turns on any one of a first pair consisting of the first and second switches and a second pair consisting of the third and fourth switches during a period corresponding to a high period of a pulse signal and which turns on the other pair during a period corresponding to a low period of the pulse signal, wherein
   the driver turns on the first and fourth switches during a predetermined precharge period after the start of activation of the charge pump circuit to charge the output capacitor and, thereafter, alternately turns on and off the first and second pairs on the basis of the pulse signal.

2. The control circuit according to claim 1, wherein
when the first input voltage is higher than the second input voltage, the driver, during the precharge period, turns on, in addition to the first and fourth switches, the third switch and turns off the second switch, so that the flying capacitor may be charged by a difference voltage between the first input voltage and the second input voltage.

3. The control circuit according to claim 1, wherein
when the first input voltage and the second input voltage are commonly connected, and when the first input voltage and second input voltage are equal to each other,
the driver turns off the second switch during the precharge period.

4. The control circuit according to claim 1, further comprising a pulse modulator which generates a pulse signal the duty ratio of which is adjusted to make a feedback voltage depending on an output voltage from the charge pump circuit equal to a predetermined reference voltage, wherein
after the end of the precharge period, the pulse modulator raises the reference voltage with time, and the driver drives the first to fourth switches on the basis of the pulse signal.

5. The control circuit according to claim 1, further comprising an input switch which is arranged on a path extending from the first input terminal to the output capacitor and the ON-resistance of which can be switched, wherein
the driver turns on the input switch at a high ON-resistance during a predetermined soft-start period from the start of activation of the charge pump circuit, and, hereafter, the ON-resistance of the input switch is switched to be low.

6. The control circuit according to claim 5, wherein
the input switch is arranged between the first switch and the first input terminal.

7. The control circuit according to claim 5, wherein
the input switch includes a plurality of MOSFETs connected in parallel to each other, and an ON-resistance is switched by a combination of ON and OFF states of the MOSFETs.

8. The control circuit according to claim 7, wherein
the first and fourth switches are MOSFETs, and body diodes of the MOSFETs of the input switch are arranged in a direction opposing the direction of body diodes of the first and fourth switches.

9. The control circuit according to claim 4, wherein
the pulse modulator performs pulse width modulation having a predetermined cycle and a changeable pulse width.

10. A charge pump circuit comprising:
a flying capacitor;
an output capacitor; and
the control circuit according to claim 1 which controls charging/discharging states of the flying capacitor and the output capacitor.

11. A control method for a charge pump circuit including a flying capacitor and an output capacitor, comprising:
   charging the output capacitor by using a first input voltage during a predetermined precharge period after the start of activation of the charge pump circuit; and
   alternately executing the charging the flying capacitor by the first input voltage and discharging the output capacitor by connecting one end of the flying capacitor to the output capacitor and applying a second input voltage to the other end of the flying capacitor,
   wherein the switching includes:

generating an error voltage obtained by amplifying an error between a feedback voltage depending on an output voltage from the charge pump circuit and a predetermined reference voltage;

slicing a triangular-wave signal having a predetermined cycle by the error voltage to generate a pulse signal having a modulated pulse width;

limiting a pulse width of the pulse signal within a predetermined range; and executing any one of the charging and the discharging during a time depending on a high period of the pulse signal and executing the other during a time depending on a low period.

12. The control method according to claim 11, wherein when the first input voltage is higher than the second input voltage, the precharging charges the flying capacitor by a difference voltage between the first input voltage and the second input voltage.

13. The control method according to claim 11, wherein the switching raises the reference voltage with time after the precharge period.

14. A control circuit for a charge pump circuit including a flying capacitor and an output capacitor, comprising:
a first switch arranged between a first input terminal to which a first input voltage is applied and one end of the flying capacitor;
a second switch arranged between the other end of the flying capacitor and a fixed voltage terminal;
a third switch arranged between a second input terminal to which a second input voltage is applied and the other end of the flying capacitor;
a fourth switch arranged between the one end of the flying capacitor and one end of the output capacitor;
a driver which turns on any one of a first pair consisting of the first and second switches and a second pair consisting of the third and fourth switches during a period corresponding to a high period of a pulse signal and which turns on the other pair during a period corresponding to a low period of the pulse signal; and
an input switch which is arranged on a path extending from the first input terminal to the output capacitor and the ON-resistance of which can be switched, wherein the input switch is turned on at a high ON-resistance during a predetermined soft-start period after the start of activation of the charge pump circuit and, thereafter, turned on at a low ON-resistance.

15. The control circuit according to claim 14, wherein the driver turns on the first and fourth switches during the predetermined precharge period after the start of activation of the charge pump circuit to charge the output capacitor, and, thereafter, alternately turns on and off the first and second pairs on the basis of the pulse signal.

16. The control circuit according to claim 15, wherein when the first input voltage is higher than the second input voltage, the driver turns on, in addition to the first and fourth switches, the third switch and turns off the second switch during the precharge period, so that the flying capacitor is charged with a difference voltage between the first input voltage and the second input voltage.

17. The control circuit according to claim 15, wherein when the first input terminal and the second input terminal are commonly connected and the first input voltage and the second input voltage are equal to each other, the driver turns off the second switch during the precharge period.

18. The control circuit according to claim 15, further comprising a pulse modulator which generates the pulse signal the duty ratio of which is adjusted to make a feedback voltage depending on an output voltage from the charge pump circuit equal to a predetermined reference voltage, wherein
after the end of the precharge period, the pulse modulator raises the reference voltage with time, and the driver drives the first to fourth switches on the basis of the pulse signal.

19. The control circuit according to claim 14, wherein the input switch is arranged between the first switch and the first input terminal.

20. The control circuit according to claim 14, wherein the input switch is arranged between a connection point between the fourth switch and the flying capacitor and the first switch.

21. The control circuit according to claim 14, wherein the input switch is arranged between the fourth switch and the output capacitor.

22. The control circuit according to claim 14, wherein the input switch is arranged between a connection point between the first switch and the flying capacitor and the fourth switch.

23. The control circuit according to claim 14, wherein the input switch includes a plurality of MOSFETs connected in parallel to each other, and an ON-resistance is switched by a combination of ON and OFF states of the MOSFETs.

24. The control circuit according to claim 23, wherein the first and fourth switches are MOSFETs, and body diodes of the MOSFETs of the input switch are arranged in a direction opposing the direction of body diodes of the first and fourth switches.

25. The control circuit according to claim 14, wherein the control circuit further comprises a pulse modulator which generates the pulse signal the duty ratio of which is adjusted to make a feedback voltage depending on an output voltage from the charge pump circuit equal to a predetermined reference voltage.

26. The control circuit according to claim 15, wherein the pulse modulator performs pulse width modulation in which a pulse width changes in a predetermined cycle.

27. A charge pump circuit comprising:
a flying capacitor;
an output capacitor; and
the control circuit according to claim 15 which controls charging/discharging states of the flying capacitor and the output capacitor.

* * * * *